(12) United States Patent
Lim et al.

(10) Patent No.: US 9,691,343 B2
(45) Date of Patent: Jun. 27, 2017

(54) DISPLAY DEVICE COMPRISING DISPLAY PANEL WITH BRIDGE PATTERNS

(71) Applicant: LG Display Co., Ltd., Seoul (KR)

(72) Inventors: Jinho Lim, Goyang-si (KR); Jaehoon Park, Goyang-si (KR); Haksu Kim, Daegu (KR); Cheolhwan Lee, Suwon-si (KR); Kyunghyun Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/235,101

(22) Filed: Aug. 12, 2016

(65) Prior Publication Data
US 2017/0061918 A1    Mar. 2, 2017

(30) Foreign Application Priority Data
Aug. 26, 2015   (KR) .......................... 10-2015-0120589

(51) Int. Cl.
```
G09G 3/36       (2006.01)
G09G 3/3275     (2016.01)
G02F 1/1368     (2006.01)
G02F 1/1362     (2006.01)
G02F 1/133      (2006.01)
G02F 1/1333     (2006.01)
G02F 1/1343     (2006.01)
G06F 3/041      (2006.01)
G06F 3/044      (2006.01)
```

(52) U.S. Cl.
CPC ......... *G09G 3/3688* (2013.01); *G02F 1/1368* (2013.01); *G02F 1/13306* (2013.01); *G02F 1/133345* (2013.01); *G02F 1/134309* (2013.01); *G02F 1/136286* (2013.01); *G09G 3/3275* (2013.01); *G02F 1/13338* (2013.01); *G02F 1/13439* (2013.01); *G02F 2201/121* (2013.01); *G02F 2201/123* (2013.01); *G06F 3/044* (2013.01); *G06F 3/0412* (2013.01); *G09G 2300/0426* (2013.01); *G09G 2310/08* (2013.01); *G09G 2320/0276* (2013.01)

(58) Field of Classification Search
CPC .................................................... G09G 3/3688
See application file for complete search history.

(56) References Cited

U.S. PATENT DOCUMENTS

| | | | |
|---|---|---|---|
| 7,671,830 B2* | 3/2010 | Kamio | G09G 3/3614 345/1.2 |
| 9,087,479 B2* | 7/2015 | Park | G09G 3/006 |
| 2004/0027315 A1* | 2/2004 | Senda | G02F 1/1333 345/30 |
| 2008/0117345 A1* | 5/2008 | Ishii | G02F 1/136204 349/40 |
| 2015/0055036 A1* | 2/2015 | Weber | G02F 1/1362 349/33 |

(Continued)

*Primary Examiner* — Jason Olson
(74) *Attorney, Agent, or Firm* — Fenwick & West LLP

(57) ABSTRACT

A disclosed display device comprises a data line of a display panel, a first switching circuit of the display panel, the first switching circuit including an input and a transistor to pass a test voltage from the input of the first switching circuit to a transistor electrode of the transistor, and a bridge pattern of the display panel, the bridge pattern electrically connecting the transistor electrode to the data line, the bridge pattern being in a different layer of the display panel than the transistor electrode.

28 Claims, 10 Drawing Sheets

(56) References Cited

U.S. PATENT DOCUMENTS

2016/0125775 A1* 5/2016 Lv ........................ G09G 3/006
  345/100
2016/0247436 A1* 8/2016 Lee ..................... G09G 3/2003

* cited by examiner

FIG. 8
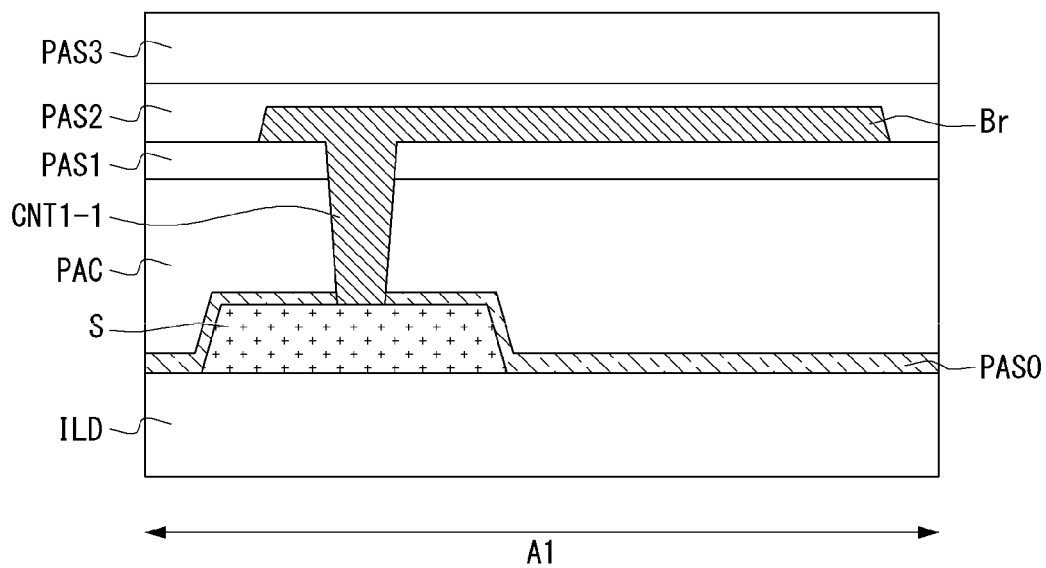
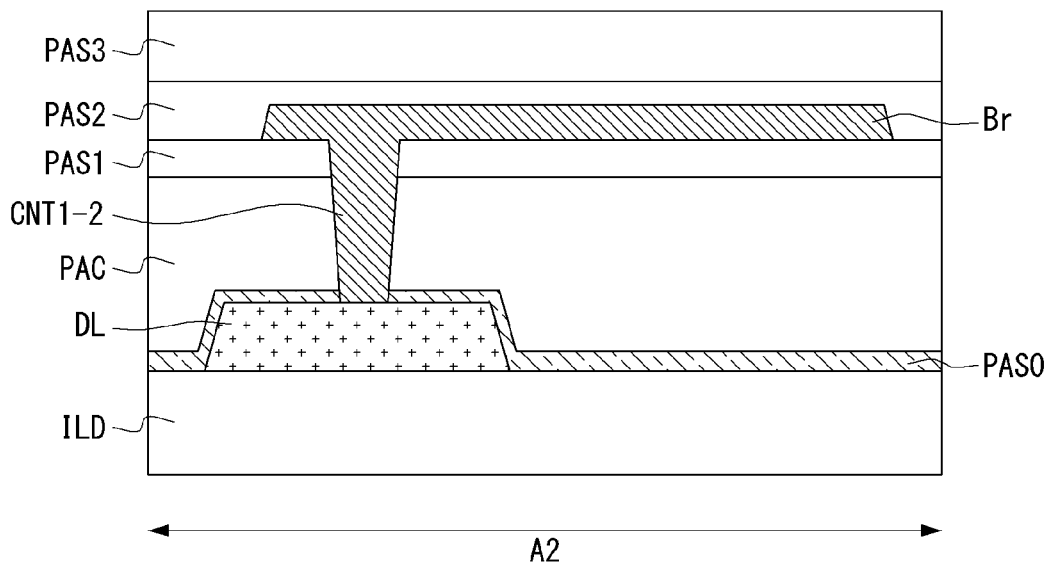

FIG. 9
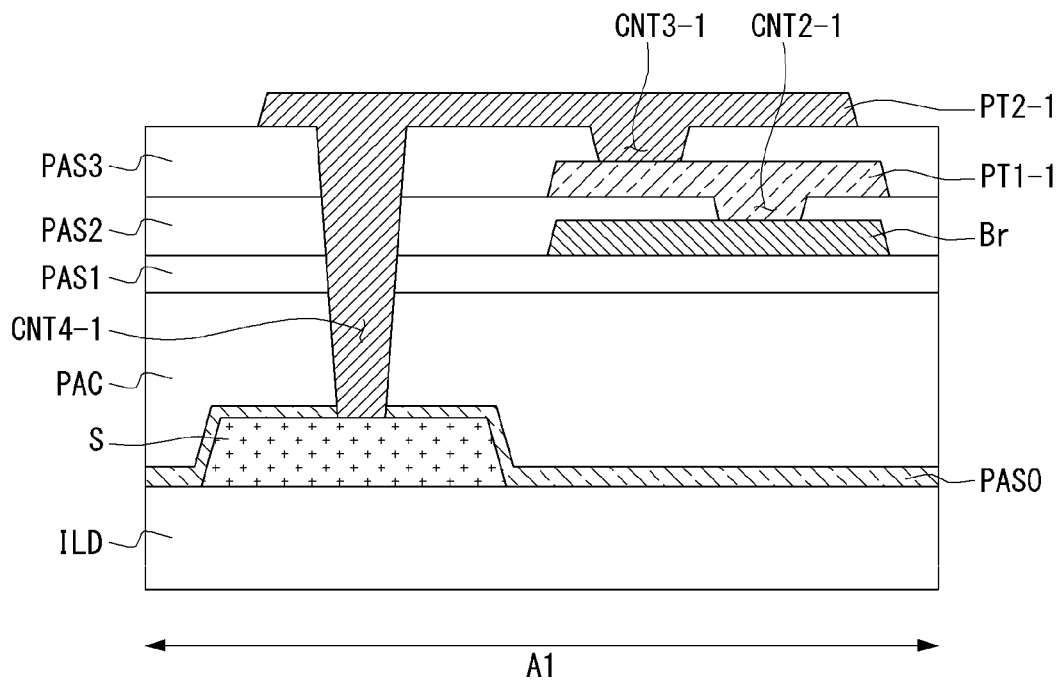
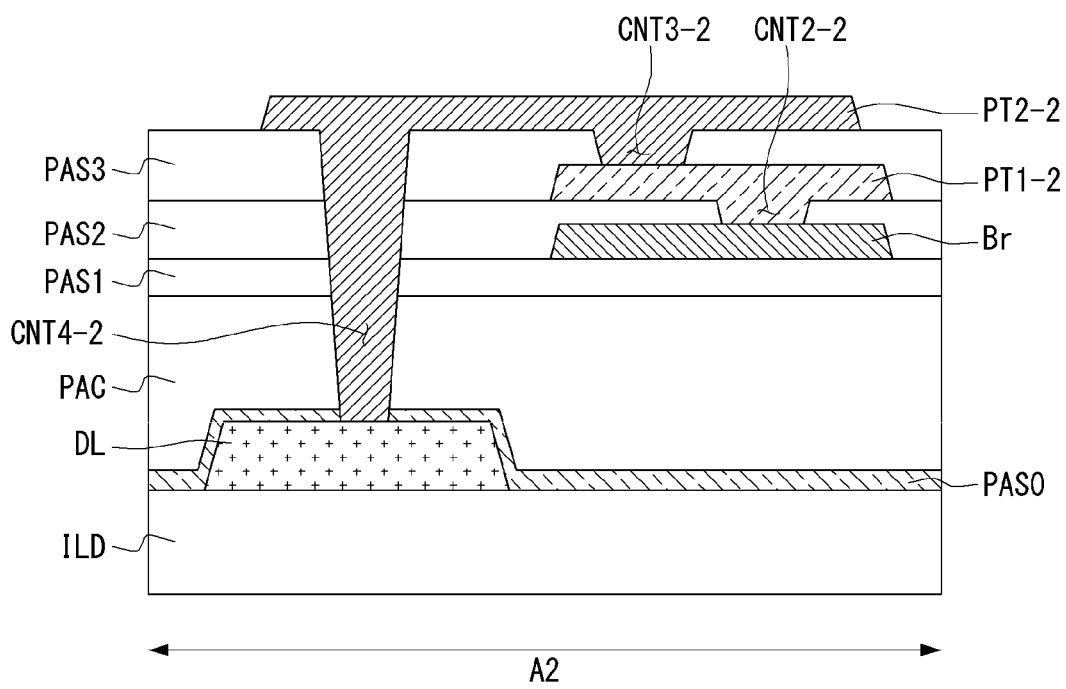

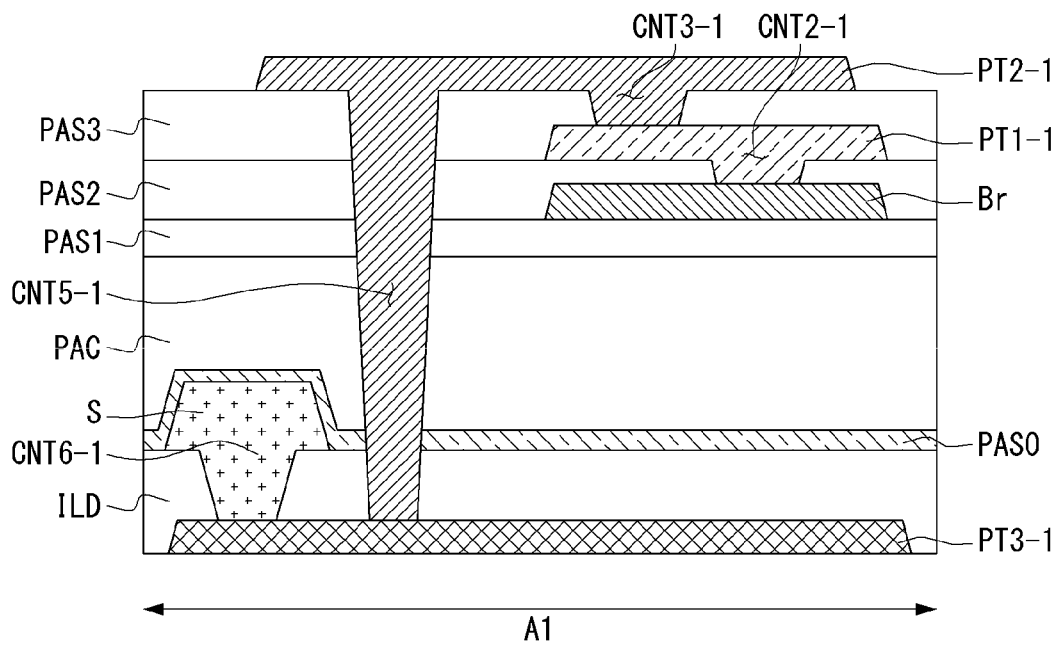
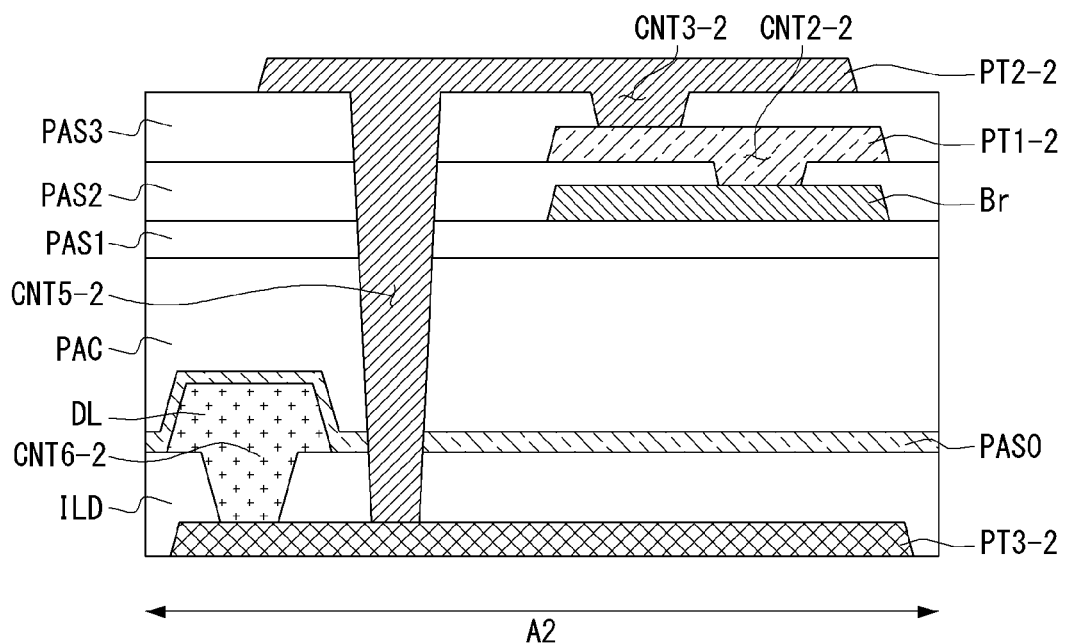

DISPLAY DEVICE COMPRISING DISPLAY PANEL WITH BRIDGE PATTERNS

CROSS-REFERENCE TO RELATED APPLICATION

This application claims the benefit of Korea Patent Application No. 10-2015-0120589 filed on Aug. 26, 2015, the entire contents of which are incorporated herein by reference for all purposes as if fully set forth herein.

BACKGROUND

Field of the Invention

The present disclosure relates to a display device.

Discussion of the Related Art

A flat panel display device includes a liquid crystal display (LCD) device, a field emission display (FED) device, a plasma display panel (PDP) device, an organic light emitting diode (OLED) display device, etc. In the flat panel display device, data lines and gate lines extend so as to cross each other in an orthogonal manner, such that a single pixel is defined at an intersection. A number of pixels may be arranged in a matrix form across the display panel. In order to drive the pixels respectively, the data lines are respectively supplied with voltages corresponding to video data to be displayed, while the gate lines are sequentially supplied with a gate pulse. In this way, the pixels in a single display line receiving the gate pulse are supplied with the video data voltages. Thereafter, all of the gate lines are sequentially scanned by the gate pulse to display the video data.

A portable display device, such as a mobile phone, tablet, etc. is widely used. Lightweight and thin display devices with a large display screen are desired by consumers.

In order to produce a lighter and thinner display device with a larger display screen, reduction of a non-display portion (e.g., a bezel portion thereof) display portion has been suggested.

SUMMARY OF THE INVENTION

Embodiments relate to a display device comprising a data line of a display panel, a first switching circuit of the display panel, the first switching circuit including an input and a transistor to pass a test voltage from the input of the first switching circuit to a transistor electrode of the transistor, and a bridge pattern of the display panel, the bridge pattern electrically connecting the transistor electrode to the data line, the bridge pattern being in a different layer of the display panel than the transistor electrode.

In one or more embodiments, the display device includes a first gate driver to drive first gate lines of a main display portion of the display panel, the main display portion of the display panel having a first width, and a second gate driver to drive second gate lines of a secondary display portion of the display panel, the secondary display portion of the display panel having a second width smaller than the first width. The data line may extend along a direction, and the second gate driver may be aligned with the data line along the direction.

Embodiments include a display device comprising a display panel comprising a main display portion having a first width along a first direction, a secondary display portion adjacent to the main display portion in a second direction perpendicular to the first direction, the secondary display portion abutting the main display portion and having a second width less than the first width along the first direction, and a corner region where the main display portion and secondary display portion abut, the corner region having an interior angle greater than 180 degrees and less than 300 degrees.

In one or more embodiments, the main display portion comprises a first plurality of gate lines extending along the first direction and a first gate driver to drive the first plurality of gate lines, and the second display portion comprises a second plurality of gate lines extending along the first direction and a second gate driver to drive the second plurality of gate lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 8 illustrates cross-sectional views of connection configurations of a bridge pattern in accordance with a first embodiment of the present disclosure.

FIG. 9 illustrates cross-sectional views of connection configurations of a bridge pattern in accordance with a second embodiment of the present disclosure.

FIG. 10 illustrates cross-sectional views of connection configurations of a bridge pattern in accordance with a third embodiment of the present disclosure.

DETAILED DESCRIPTION OF THE EMBODIMENTS

Figure 1:
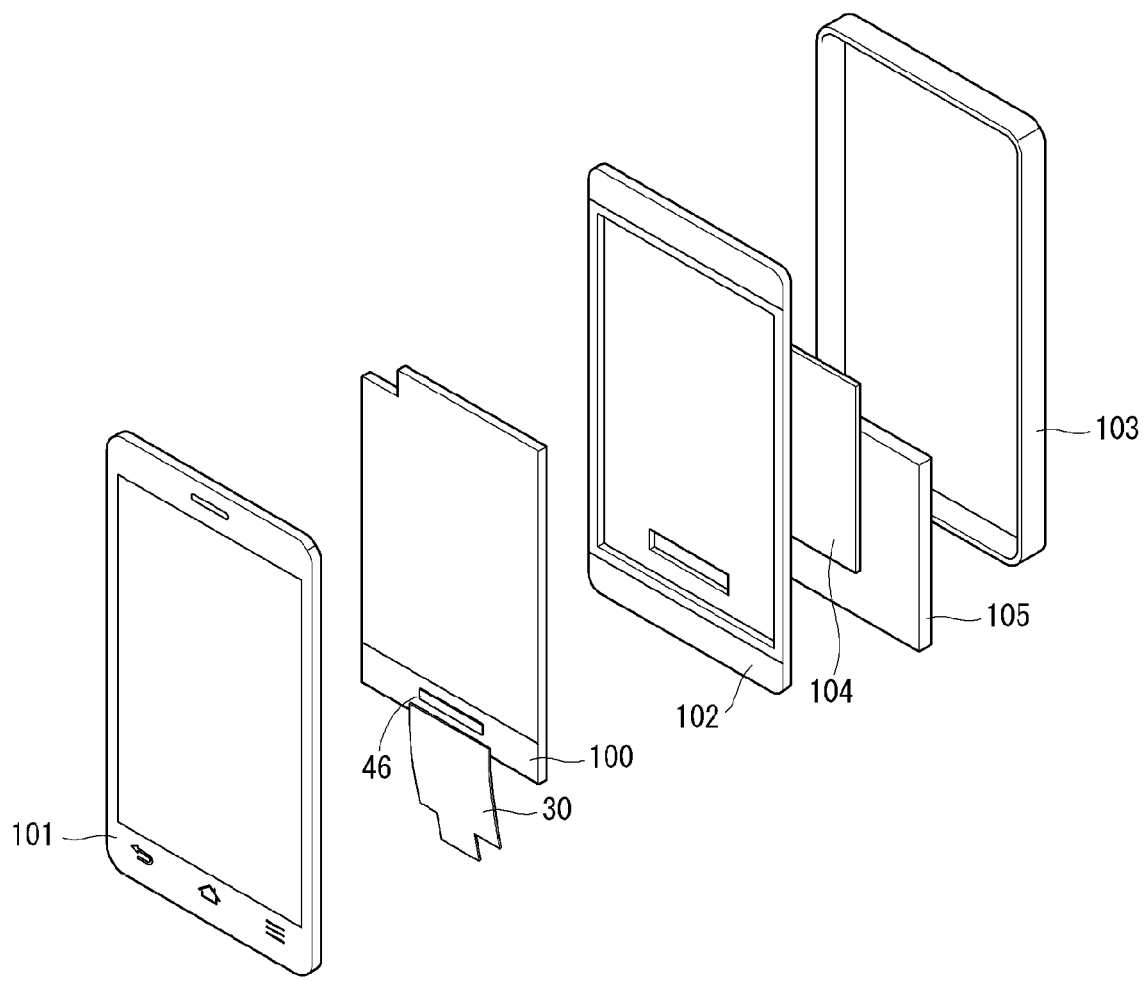
FIG. 1 illustrates an exploded perspective view of a display device in accordance with the present disclosure.

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, the various embodiments of the present disclosure will be described in details with reference to attached drawings.

FIG. 1 illustrates an exploded perspective view of a display device in accordance with the present disclosure.

Referring to FIG. 1, the display device in accordance with the present disclosure includes a display module, a front cover 101, a back cover 103, a mid-frame 102, a main board 104, a battery 105, etc. The display device of the present disclosure may be implemented as a flat panel display device such as a liquid crystal display (LCD) device, an organic light emitting diode (OLED) display device, or the like. The display module includes a display panel 100 for the flat panel display device, and a driver circuit to drive the display panel. Touch sensors may be disposed across and on an entire screen of the display panel 100. The display panel driver circuit may include a drive IC (D-IC) 46, and a flexible circuit board 30 to connect the drive IC 46 to the main board 104. The drive IC 46 writes video data inputted via the main board 104 to pixels of the display panel 100. The flexible circuit board 30 may be implemented as either a FPC (Flexible Printed Circuit) board or an FFC (Flexible Flat Cable) board.

In one side of the front cover 101, a tempered glass for covering the display panel 100 may be disposed. The front cover 101 defines a front face of the mobile terminal. Through the front face of the mobile terminal, a screen of the display panel 100 may be viewed. On the front face portion of the mobile terminal, auxiliary components 22 (e.g., a camera and a variety of sensors) may be disposed. On a rear face portion of the mobile terminal, a rear camera and a variety of further sensors may be disposed. The sensors include, for example, a proximity sensor, a gyro-sensor, a geo-magnetic sensor, a motion sensor, a luminance sensor, a RGB sensor, a Hall sensor, a temperature/humidity sensor, a heart-beat sensor, a fingerprint recognition sensor, etc.

Between the front cover 101 and the back cover 103, the display module, the mid-frame 102, the main board 104, the battery 105, etc. are disposed. The mid-frame 102 supports the display panel 100, and spatially separates the display panel 100 and the main board 104 from each other. The flexible circuit board 30 of the display module may be connected to the main board 104 via a slot in the mid frame 102. The front cover 101 and the back cover 103 may have an A/V (Audio/Video) input unit, a user input unit, a speaker, a microphone, etc. disposed therein. The A/V input unit, user input unit, speaker, and microphone may be connected to the main board 104. The user input unit may be implemented as a touch key pad, a dome switch, a touch pad, a jog wheel, a jog switch, etc.

In the main board 104, circuits of a host system (70 in FIG. 3) may be embedded. The host system 70 may include a display module, a wireless communication module, a near field communication module, a mobile communication module, a broadcast receiver module, an A/V input unit, a GPS (Global Position System) module, a power supply, etc. The user input unit, speaker, microphone, battery 105, etc. may be connected to the host system 70. The power supply may remove a noise from a voltage of a battery 105 which, in turn, may be supplied to respective power supply modules for the host system and display panel driver circuit. In this embodiment, the host system 70 in FIG. 3 may be implemented as a phone system by way of example. However, the present disclosure is not limited thereto. For example, the display device of the present disclosure may be applied to a television system, a set-top box, a navigation system, a DVD player, a Blu-ray player, a personal computer, a home theater system, or the like.

Figure 2:
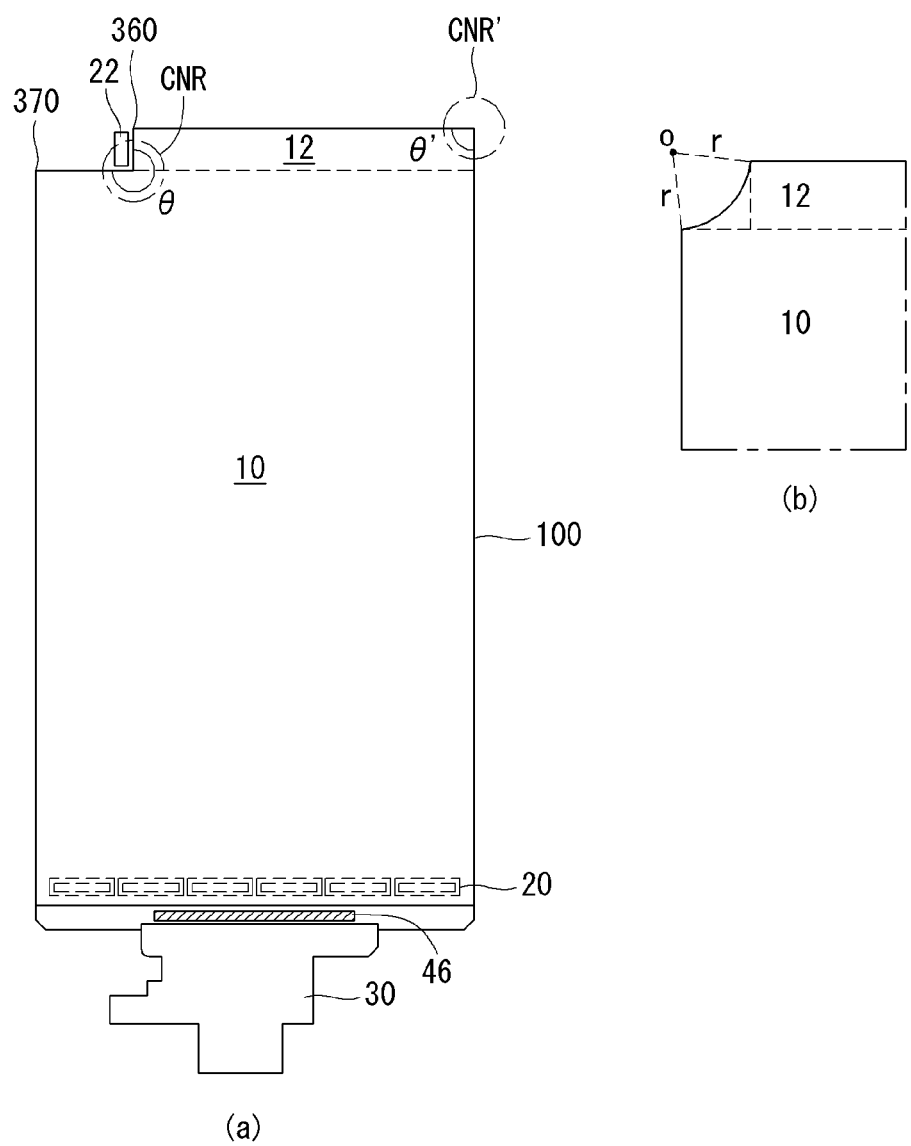
FIG. 2 and FIG. 3 illustrate detailed views of a display module in accordance with the present disclosure.
Figure 3:
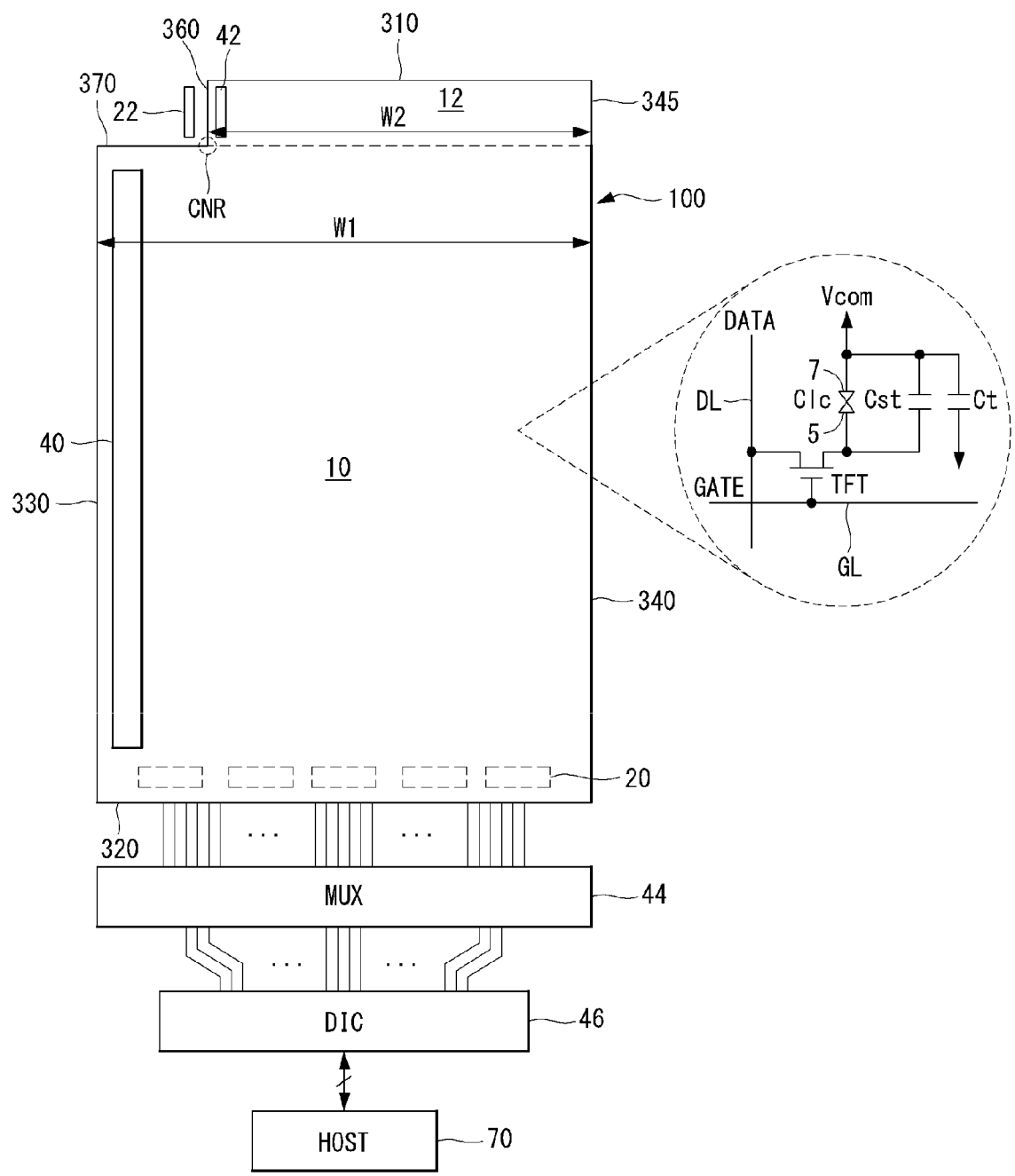

FIG. 2 and FIG. 3 illustrate detailed views of the display module, respectively.

Referring to FIG. 2 and FIG. 3, the display panel 100 has generally a rectangular shape. However, the present disclosure is not limited thereto. The display panel 100 has at least one first corner CNR which is chamfered as shown in FIG. 2(a) to have an inner angle θ between 180° and 300°. Specifically, a top edge 370 of the main display panel portion 10 (also referred to as "a main display portion 10") extending away from the first corner CNR and a side edge 360 of the secondary display panel portion 12 (also referred to as "a secondary display portion 12") extending away from the first corner CNR form an inner angle between 180° and 300° within the display panel 100. An inner angle refers to the internal angle of a polygon shape, such as an internal angle measured within the display panel 100. Thus, the chamfering creates a cut-off space 350 in which a camera and/or at least one sensor may be disposed. In another embodiment, the first corner CNR may be chamfered in an arc shape as shown in FIG. 2(b). In this case, a center o of the arc is located outside the display panel. In this way, the center o of the arc may not be located inside a corner portion of the display panel whose inner angle is about 90°. A radius r of the arc defines a shape of the first corner CNR. For example, in order to increase a concave degree of the arc, the radius r may be smaller. The display panel 100 may include at least one second corner CNR' which has an inner angle θ' of 90°.

The display panel 100 includes a display portion having an array of pixels to display an input video image. The pixel array is divided between the main display panel portion 10 and a secondary display panel portion 12 in the present disclosure. The main display panel portion 10 may be located below the first corner CNR. The first display panel portion 10 has a width W1, and the secondary display panel portion 12 has a width W2 in the direction x.

In the example shown in FIG. 3, the main display panel portion 10 and the secondary display panel portion 12 abut each other in a direction y. In one example, a left side edge 330 of the main display panel portion 10 is perpendicular to the top edge 370 of the main display panel portion 10, and is parallel to a right side edge 340 of the main display panel portion 10. A bottom edge 320 between the side edges 330 and 340 is parallel to the top edge 370.

A top edge 310 of the secondary display panel portion 12 is perpendicular to the left side edge 360 of the secondary display panel portion 12, and is parallel to the bottom edge 320 of the main display panel portion 10. A right side edge 345 of the secondary display panel portion 12 is parallel to the left side edge 360 of the secondary display panel portion 12, and is aligned with the side edge 340 of the main display panel portion 10. In the example shown in FIG. 3, a width W1 of the bottom edge 320 of the main display panel portion 10 is longer than a width W2 of the top edge 310 of the secondary display panel portion in the direction x.

The display panel 100 further includes a gate driver 40 for driving gate lines of the main display panel portion 10 and gate driver 42 for driving gate lines of the secondary display panel portion 12. The gate lines of the main display panel portion 10 and the secondary display panel portion may extend in a direction x perpendicular to the direction y.

The secondary display panel portion 12 may be located between the first and second corners CNR and CNR'. In this embodiment, the secondary display panel portion 12 may be located above the main display panel portion 10. However, the present disclosure is not limited thereto.

The secondary display panel portion 12 may display data together with the main display panel portion 10 or independently from the main display panel portion 10. The secondary display panel portion 12 may display data frequently viewed by a user, such as a communication quality state, a battery power state, a SNS (Social Network Service) message, a current time, etc. Such data to be displayed on the secondary display panel portion 12 may be selected by the user.

The display panel 100 includes a liquid crystal (LC) layer and upper and lower substrates, which face each other with the LC layer disposed therebetween.

The pixel array of the display panel 100 includes data lines DL, gate lines GL, thin film transistors TFT respectively disposed at intersections between the data lines DL and gate lines GL, pixel electrodes 5 respectively coupled to the thin film transistors TFT, storage capacitors Cst respectively coupled to the pixel electrodes 5, etc. Each of the thin film transistors TFT turns on in response to a gate pulse from the gate line GL to allow supply of a data voltage from each data line DL to each pixel electrode 5. The liquid crystal LC layer is activated based on a voltage difference between the data voltage applied to the pixel electrode 5 and a common voltage Vcom applied to a common electrode 7, thereby adjusting an optical transmittance therethrough to display an image.

In the lower substrate of the display panel 100, a TFT array may be disposed. The TFT array includes data lines DL, gate lines GL, thin film transistors TFT respectively disposed at intersections between the data lines DL and gate lines GL, pixel electrodes 5 respectively coupled to the thin film transistors TFT, storage capacitors Cst respectively coupled to the pixel electrodes 5, etc. The TFTs may be implemented as an amorphous silicon (a-Si) TFT, a LTPS (low temperature poly silicon) TFT, an oxide TFT, etc. The TFTs are connected respectively to the pixel electrodes for sub-pixels. In FIG. 3, characters "Clc" refer to a capacitance of the liquid crystal layer between the pixel electrode 5 and common electrode 7.

The TFT acts as a switch element to allow supply of data voltage from the data line DL to the pixel electrode 5 in response to a gate pulse from the gate line GL. Each pixel displays an input image, by adjusting an optical transmittance through the liquid crystal molecules using a voltage difference between the pixel electrode 5 receiving the data voltage through the TFT and the common electrode 7 receiving the common voltage Vcom.

In FIG. 3, character "Ct" refers to an in-cell touch sensor embedded in the pixel array. The in-cell touch sensor Ct may be implemented as a touch sensor of a capacitance type. The capacitance-type touch sensor may be classified into a self-capacitance type sensor and a mutual-capacitance type sensor. In the in-cell touch technique, signals applied to the pixels may act as a noise to the touch sensors since the touch sensors Ct are coupled to the signal lines DL and GL and to the pixel electrode 5 for the pixels. In order to reduce interactions between the pixels and touch sensors, a single frame period for the display panel may be time-divided into a display period, in which input image data is written into the pixels, and a touch sensing period in which the touch sensors operate. The common electrode 7 may be divided into electrodes for the in-cell touch sensors and hence supply the common voltage Vcom as a reference voltage to the pixels during the display period and supply charges to the in-cell touch sensors during the touch sensing period.

On the upper substrate of the display panel 100, a color filter array may be disposed. The color filter array may include a black matrix BM, and a color filter CF. The common electrode 7 may be formed on the upper substrate in case of a vertical field-driven approach such as a TN (twisted nematic) mode, and a VA (vertical alignment) mode, while the common electrode 7 together with the pixel electrode 5 may be formed on the lower substrate in case of a horizontal field-driven approach such as an IPS (in-plane switching) mode, and a FFS (fringe field switching) mode.

To the upper and lower substrates of the display panel 100, polarization plates may be attached respectively. Further, on the upper and lower substrates of the display panel 100, alignment layers may be disposed respectively to set a pre-tilt angle of liquid crystals. A spacer may be disposed between the upper and lower substrates to secure a cell gap for the liquid crystal layer.

A display panel drive IC 46 is configured to write input image data to the pixels. The display panel drive IC 46 includes a timing controller and a power supply module. The display panel drive IC 46 may be integrated into a drive IC. Further, a data driver 20 and gate drivers 40 and 42 may be integrated in the drive IC. In one embodiment, the gate driver 42 is disposed at a side of the secondary display panel portion 12 and above the main display panel portion 10, and is aligned with a data line Dm in the main display panel portion 10 along the direction y.

The data driver may receive video input data from the timing controller, convert the data into positive/negative gamma-compensation voltages, and then output positive/negative data voltages. Thereafter, the data voltages may be supplied to the data lines DL.

Figure 4:
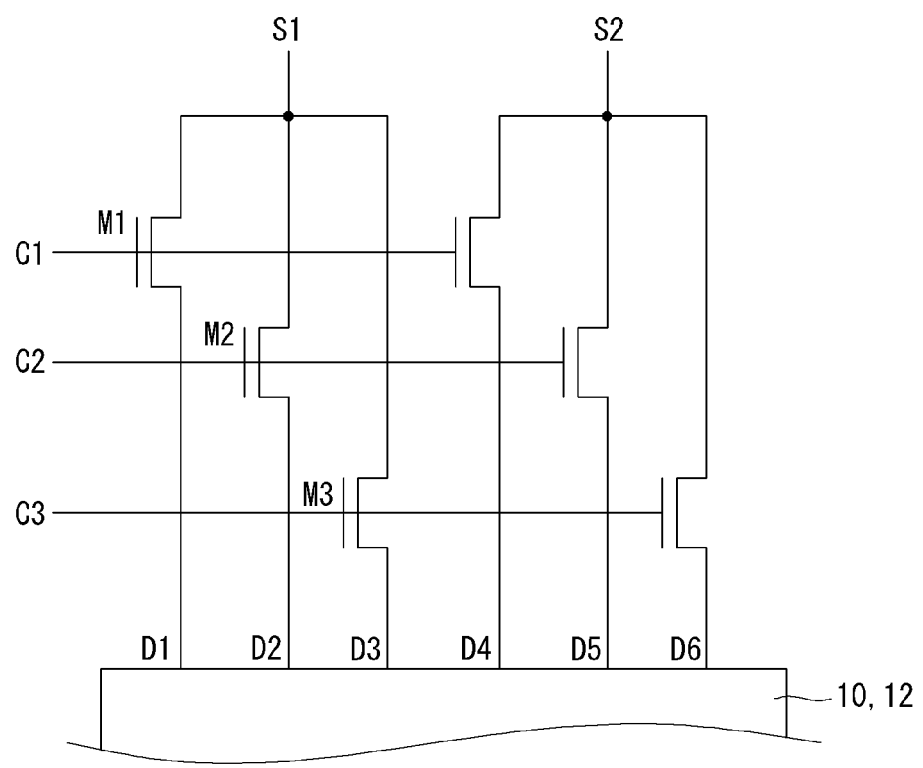
FIG. 4 illustrates a multiplexer in accordance with one embodiment of the present disclosure.

Between the data driver and data lines DL, a multiplexer MUX may be disposed. The multiplexer 44 may be formed on a substrate SUBS of the display panel 100 or may be embedded in a display panel driver circuit (or the drive IC 46). The multiplexer 44 may distribute the data voltage from the data driver to the data lines DL under control of the timing controller. In case of a 1:3 multiplexer as shown in FIG. 4, the multiplexer may time-divide the data voltage inputted via a single output channel of the data drivers so as to supply the divided voltages to three data lines, respectively. Therefore, when employing the 1:3 multiplexer, a number of channels of the drive IC may be reduced to one third. In FIG. 4, reference numerals M1 to M3 respectively refer to TFTs of the multiplexer 44, and reference numerals C1 to C3 respectively refer to MUX selection signals outputted from the timing controller. Each of the TFTs M1 to M3 of the multiplexer 44 may supply the data voltage to each of the data lines in response to each of the MUX selection signals C1 to C3.

Under control of the timing controller, the first gate driver 40 may sequentially supply a gate pulse to the gate lines GL in the main display portion 10, while the second gate driver 42 may sequentially supply a gate pulse to the gate lines GL in the secondary display portion 12. The gate pulses from the first and second gate drivers 40 and 42 may be synchronized with the data voltage. Together with the pixel array, the transistors of the first and second gate drivers 40 and 42 may be formed on the lower substrate of the display panel 100 using a GIP (gate in panel) process. The first gate driver 40 and second gate driver 42 may be individually controlled under control of the timing controller.

The timing controller may receive timing signals synchronized with the input image data. The timing signals may include a vertical synchronization signal Vsync, a horizontal synchronization signal Hsync, a data enable signal DE, a main clock CLK, etc.

The power supply module may include a DC-DC converter. The power supply module may regulate an input voltage from the host system (not shown) to generate a drive voltage for the display panel 100. The DC-DC converter may generate positive/negative gamma-voltages VDH and VDL, a gate high voltage VGH, a gate low voltage VGL, a common voltage Vcom, a logic power voltage Vcc, etc. using a PWM modulation circuit, a boost converter, a regulator, a charge pump, etc. The gate high voltage VGH refers to a high voltage of a gate pulse set above a threshold voltage of the TFTs in the pixel array and gate driver. The gate low voltage VGL refers to a low voltage of the gate pulse set below the threshold voltage of the TFTs. The common voltage Vcom may be supplied to the common electrode 7 for the liquid crystal cells Clc. The positive/negative gamma-voltages VDH and VDL may be voltage-divided based on gradation levels using a voltage divider circuit and then inputted to a digital to analog converter DAC of the data driver. The DAC may select voltage levels of the positive/negative gamma-voltages based on digital data to generate the data voltages. The power supply module may regulate an output voltage by varying a frequency (or a step-up frequency) of a PWM signal based on a reference frequency from the timing controller.

The display panel driver circuit IC may further include a backlight driver. The backlight driver may adjust a backlight brightness by varying a duty ratio of a dimming signal based on the input image. The dimming signal may be generated as a PWM (pulse width module) signal.

Figure 5:
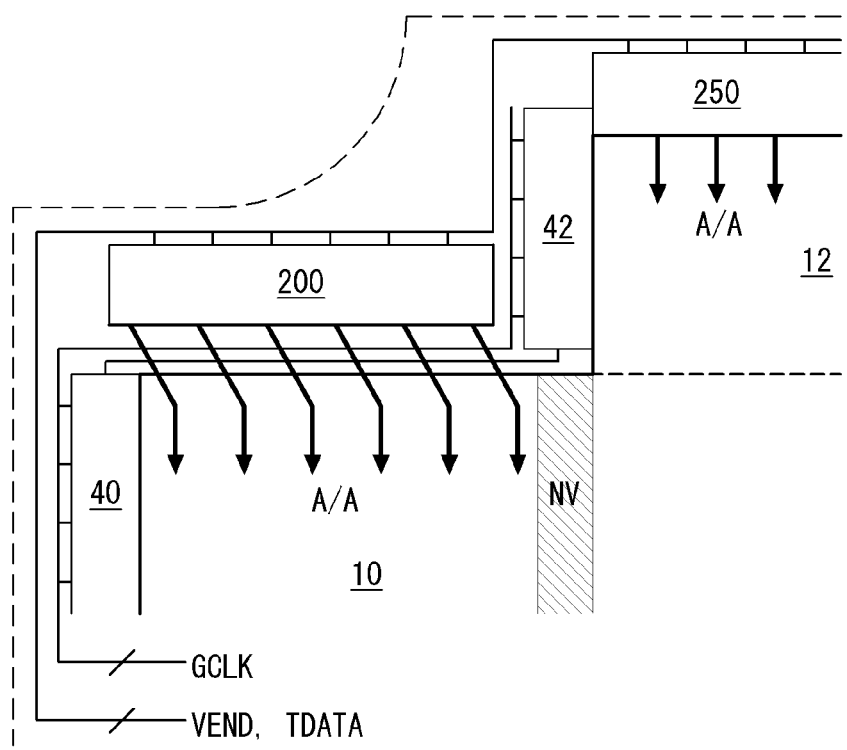
FIG. 5 illustrates an enlarged view of a corner of a display panel in accordance with one embodiment of the present disclosure.

FIG. 5 illustrates an enlarged view of a corner of the display panel.

Referring to FIG. 5, a main switch block 200 may be located above the main display portion 10. The main switch block 200 may allow application of a test data voltage TDATA to data lines DL of the main display portion 10. An additional switch block 250 may be located above the secondary display portion 12, and may allow application of a test data voltage TDATA to data lines DL for the secondary display portion 12.

The main switch block 200 may include switch elements of which the number corresponds to the number of the data lines DL. Each switch element Tr may have a gate electrode coupled to a test enable signal VEND input terminal, a drain electrode coupled to a corresponding one of test data voltage input pads, a source electrode coupled to a bridge pattern Br in a first connection area A1. Before the data driver 20 is connected to the display panel 100, each of the test data voltage input pads receives the test data voltage TDATA for an image inspection of the display panel 100. The number of the test data voltage input pads may correspond to the number of the data lines for the main display portion 10. Each of the test data voltage input pads may receive a corresponding one of R, G, and B test data voltages. In other embodiments, the drain electrode may be coupled to the bridge pattern Br instead of the source electrode S.

In response to the test enable signal VEND, each of the switch elements and so on in the main switch block 200 may deliver the respective test data voltages from the test data voltage input pads to the respective bridge patterns.

Each of the data lines for the main display portion 10 may extend in a vertical direction y, or in an angled manner from the vertical direction to be coupled to each of the switch elements and so on in the main switch block 200. However, the display panel may be divided into the main and secondary display portions, thus it may be difficult to apply the test data voltages to some data lines below the second gate driver 42. Specifically, the main switch block 200 cannot be disposed in the area of the second gate driver 42, hence, the test data voltage could not be applied to the data lines disposed in an inspection incapable region NV.

Figure 6:
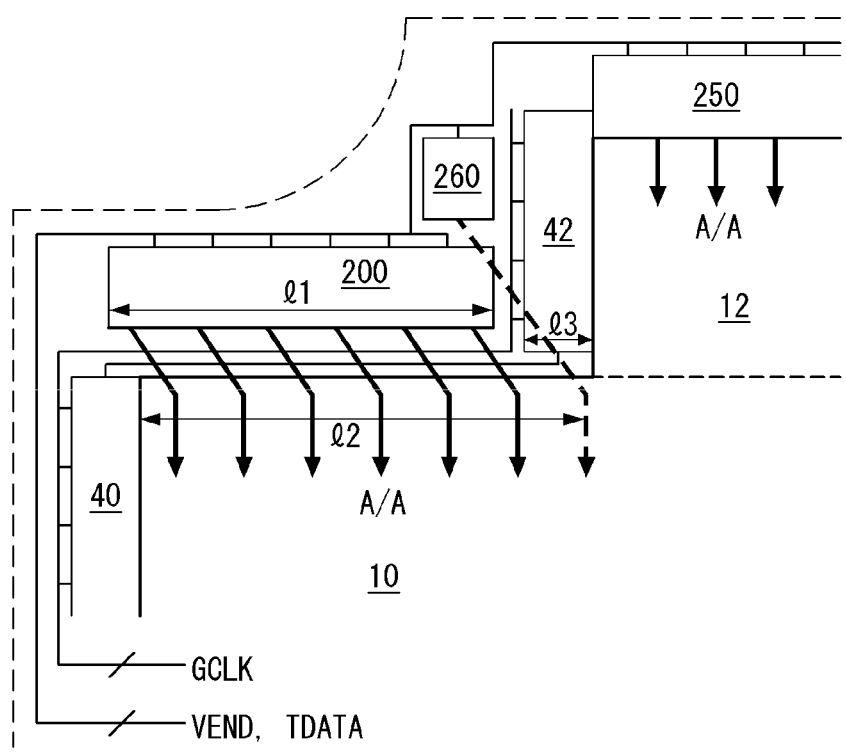
FIG. 6 illustrates an enlarged view of a corner of a display panel in accordance with another embodiment of the present disclosure.
Figure 7:
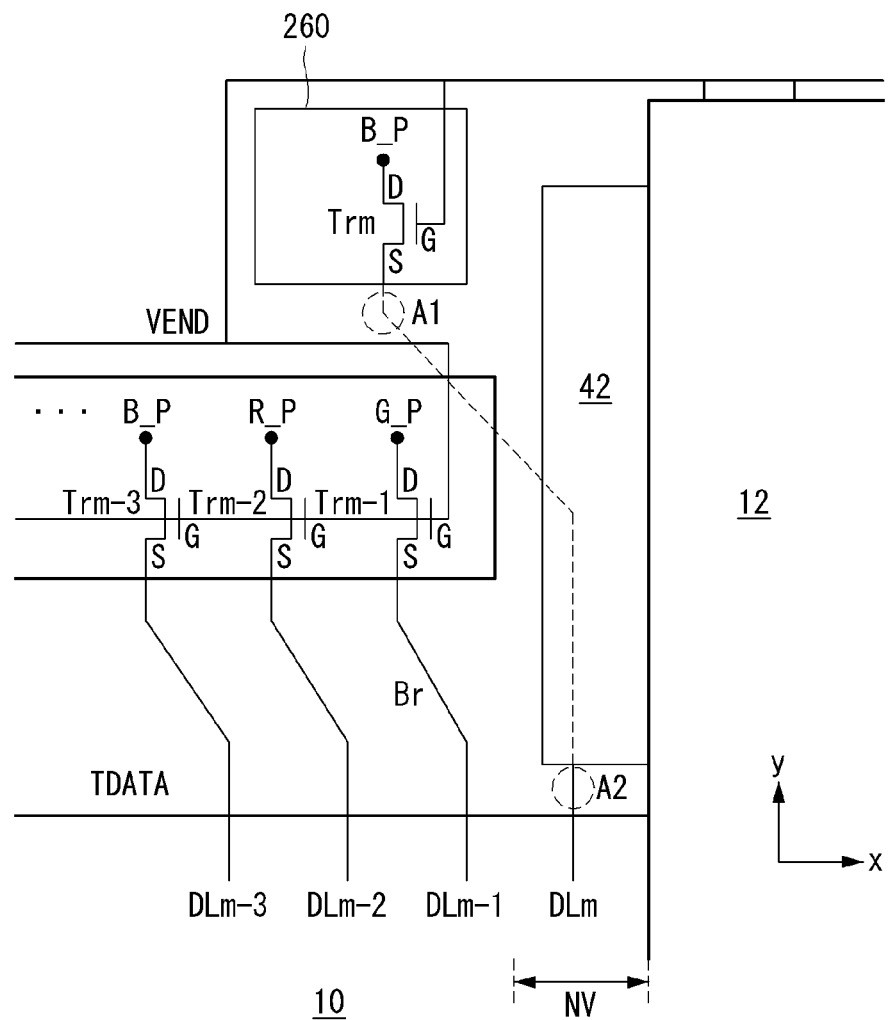
FIG. 7 illustrates a switch block and bridge patterns in accordance with the present disclosure.

FIG. 6 illustrates a display device in accordance with another embodiment of the present disclosure. FIG. 7 illustrates switch elements and bridge patterns in FIG. 6. Same components in FIGS. 6 and 7 are indicated with same reference numerals, thus detailed description thereof is omitted herein for the sake of brevity.

Referring to FIG. 6 and FIG. 7, the display device of this embodiment may further include a secondary switch block 260 having secondary switch elements disposed therein. The secondary switch block 260 may be disposed in an inner space of a corner of the display panel, which is defined by one side of the main switch block 200 and one side of the second gate driver 42.

The main switch block 200 includes a first to a m-1_th switch elements . . . Tr[m-2], Tr[m-1] and the secondary switch block 260 includes a m_th switch element Tr[m]. Each switch element Tr may have a gate electrode coupled to a test enable signal VEND input terminal, a drain electrode coupled to a corresponding one of test data voltage input pads, a source electrode coupled to a bridge pattern Br in a first connection area A1. Before the data driver 20 is connected to the display panel 100, each of the test data voltage input pads receives the test data voltage TDATA for an image inspection of the display panel 100. The number of the test data voltage input pads may correspond to the number of the data lines for the main display portion 10. Each of the test data voltage input pads may receive a corresponding one of R, G, and B test data voltages. In other embodiments, the drain electrode may be coupled to the bridge pattern Br instead of the source electrode S.

A length L1 of the main switch block 200 along which the switch elements Tr are arranged is shorter than a length L2 of a side of the main display portion 10 intersecting with the data lines. This is because the second gate driver 42 resides adjacent to the main switch block 200 above the side of the main display portion 10 intersecting with the data lines. As a result, the number of the switch elements Tr arranged in the main switch block 200 may be smaller than the number of the data lines DL arranged in the main display portion 10. That is the data lines DLm may fall into an inspection-incapable region NV.

On the other hand, the secondary switch block 260 may be supplemented so that a total number of the switch elements in the main and secondary switch blocks 200 and 260 together can be equal to the number of the data lines DL arranged in the main display portion 10. In this way, all of the data lines DL may receive the test data voltages TDATA. The secondary switch elements may operate in the same manner as the switch elements Tr in the main switch block 200 and the secondary switch block 260.

In one embodiment, a connection between the secondary switch block 260 and a data line, and connections between the main switch block 200 and respective data lines are implemented with bridge patterns. In another embodiment, the main switch block 200 and respective data lines can be directly connected through a single layer (e.g., a layer including a source/drain electrode or a data line) without conductive patterns in different layers, while the secondary switch block 260 and a data line are connected through a bridge pattern employing conductive patterns in different layers.

The bridge patterns Br to respectively connect the switch elements Tr[m-2], Tr[m-1], Trm, and so on to the data lines DLm-2, DLm-1, DLm, and so on as shown in FIG. 7. The bridge patterns Br may be disposed in a different array layer from the source electrodes S of the switch elements Tr[m-2], Tr[m-1], Trm, and so on and the data line DLm-2, DLm-1, DLm, and so on. In this way, in order to form an electrical connection between the data line DLm in one side end of the main display portion 10, and the m-th switch element Trm, a corresponding bridge pattern Br may form a current path therebetween without a short circuit in spite of the overlapping between the second gate driver 42 and the data line. In one embodiment, the bridge pattern Br extends in a diagonal direction from data line DLm to source electrode S.

FIG. 8 through FIG. 10 illustrate respective embodiments where an electrical connection between a source electrode of a switch element and an associated data line is formed via a bridge pattern.

FIG. 8 illustrates cross-sectional views of first and second connection regions A1 and A2 in accordance with a first embodiment of the present disclosure.

Referring to FIG. 8, the bridge pattern Br is connected to a source electrode S of a switch element Tr in the first connection region A1, and is connected to a data line DL in the second connection region A2.

The source electrode S of the switch element Tr may be located above an interlayer insulating layer ILD in the first connection region A1. The source electrode S of the switch element Tr may be made of Ti/Al/Ti. Over the source electrode S of the switch element Tr, there may be disposed a stack of a first insulating layer Pas0, an organic insulating layer PAC, and a first passivation layer Pas1 in this order. Below the first insulating layer Pas0, there may be formed a metal pattern made of a gate metal, which is not shown for the sake of a simplicity of the illustration. On the first passivation layer Pas1, the bridge pattern Br is patterned. The bridge pattern Br may be made of the same material as that of a routing line for application of a touch drive voltage to the touch sensor Ct. For example, the bridge pattern Br may be made of Mo/AL/Mo. The bridge pattern Br may be coupled to the source electrode S of the switch element Tr via a first contact via CNT1-1 passing through the first insulating layer Pas0, organic insulating layer PAC and first passivation layer Pas1.

The data line DL may be disposed on an interlayer insulating layer ILD in the second connection region A2. Over the data line DL, there may be disposed a stack of the first insulating layer Pas0, organic insulating layer PAC and first passivation layer PAS1 in this order. On the first passivation layer Pas1, the bridge pattern Br is patterned. The bridge pattern Br may be coupled to the data line DL via the second contact via CNT1-2 passing through the first insulating layer Pas0, organic insulating layer PAC and first passivation layer Pas1.

In the embodiment as shown in FIG. 8, the bridge pattern Br is disposed in an array layer higher than an array on which the metal patterns defining the source electrode S of the switch element Tr and the data line DL are disposed. That is, since the bridge pattern Br is disposed in an array layer different from an array layer on which the transistors are disposed in the second gate driver 42, the transistor of the second gate driver 42 and the bridge pattern Br may not electrically contact each other in spite of vertical overlapping therebetween.

The bridge pattern Br as shown in FIG. 8 may be patterned after etchings of the first insulating layer Pas0, organic insulating layer PAC and first passivation layer PAS1. That is, in order to form the bridge pattern Br and the first and second contact vias CNT1-1 and CNT1-2, a photolithography process should be carried out after formation of the first passivation layer PAS1. To the contrary, in a conventional transistor forming process, after a formation of the first passivation layer PAS1, a photolithography process may not be carried out. Therefore, the formation of the bridge pattern Br and second contact via CNT1-2 in accordance with the first embodiment may increase the number of process steps compared to a number of process steps in a conventional display panel formation process. In this regard, FIG. 8 illustrates cross-sectional views of first and second connection regions A1 and A2 in accordance with a second embodiment of the present disclosure, where the number of process steps for formation of the first and second connection regions may decrease as compared to the first embodiment. Between the first and second embodiments, the same reference numerals will be designated to the same components, which will be not described in details below.

Referring to FIG. 9, in the first connection region A1, a source electrode S of a switch element Tr may be located on an interlayer insulating layer ILD. Over the source electrode S of the switch element Tr, there may be disposed a stack of a first insulating layer Pas0, an organic insulating layer PAC and a first passivation layer PAS1 in this order. On the first passivation layer PAS1, a bridge pattern Br is patterned. The bridge pattern Br may be located at a position horizontally adjacent to a vertically overlapping portion between the source electrode S of the switch element Tr and a horizontal plane of the bridge pattern Br.

A second passivation layer PAS2 may be formed to cover the bridge pattern Br. On the second passivation layer PAS2, a patterned first conductive pattern PT1-1 may be disposed. The first conductive pattern PT1-1 may be made of the same material as that of the common electrode 7. For example, the first conductive pattern PT1-1 may be made of a transparent electrode ITO. A third passivation layer PAS3 may be formed to cover the first conductive pattern. On the third passivation layer PAS3, a patterned second conductive pattern PT2-1 may be disposed, which may be made of the same material as that of the pixel electrode 5. For example, the second conductive pattern PT2-1 may be made of a transparent electrode ITO.

The bridge pattern Br may be coupled to the first conductive pattern PT1-1 via a third contact via CNT2-1 passing through the second passivation layer PAS2. The first conductive pattern PT1-1 may be coupled to the second conductive pattern PT2-1 via a fourth contact via CNT3-1 passing through the passivation layer PAS3. The second conductive pattern PT2-1 may be connected to the source electrode S of the switch element Tr via a fifth contact via CNT4-1 passing through the organic insulating layer PAC, and the first to third passivation layers PAS3.

In the second connection region A2, a data line DL may be disposed on an interlayer insulating layer ILD. Over the data line DL, there may be a stack of the first insulating layer Pas0, organic insulating layer PAC and first passivation layer PAS1 in this order. On the first passivation layer PAS1, the bridge pattern Br is patterned. The bridge pattern Br may be located at a position horizontally adjacent to a vertically overlapping portion between the data line DL and a horizontal plane of the bridge pattern Br.

A second passivation layer PAS2 may be formed to cover the bridge pattern Br. On the second passivation layer PAS2, a patterned third conductive pattern PT1-2 may be disposed. A third passivation layer PAS3 may be formed to cover the third conductive pattern PT1-2. On the third passivation layer PAS3, a fourth conductive pattern PT2-2 may be disposed.

The bridge pattern Br may be coupled to the third conductive pattern PT1-2 via a sixth contact via CNT2-2 passing through the second passivation layer PAS2. The third conductive pattern PT1-2 may be coupled to the fourth conductive pattern PT2-2 via a seventh contact via CNT3-2 passing through the third passivation layer PAS3. The fourth conductive pattern PT2-2 may be coupled to the data line DL via the eighth contact via CNT4-2 passing through the organic insulating layer PAC, and the first to third passivation layers PAS1 to PAS3.

In the embodiment as shown in FIG. 9, the fifth contact via CNT4-1 and eighth contact via CNT4-2 may be formed by a photolithography process after the formation of the third passivation layer PAS3. In this regard, the photolithography process after the formation of the third passivation layer PAS3 is also necessary to form the pixel electrode in a conventional transistor formation process. That is, in accordance with this embodiment, without additional process steps, the source electrode S of the switch element Tr and the data line DL may be connected to each other via the bridge pattern Br.

FIG. 10 illustrates cross-sectional views of first and second connection regions A1 and A2 in accordance with a third embodiment of the present disclosure. Referring to FIG. 9, in the first connection region A1, an interlayer insulating layer ILD may be formed to cover a fifth conductive pattern PT3-1. On the interlayer insulating layer ILD, a source electrode S of a switch element Tr may be disposed.

Over the source electrode S of the switch element Tr, there may be disposed a stack of a first insulating layer Pas0, an organic insulating layer PAC and a first passivation layer PAS1 in this order. On the first passivation layer PAS1, a bridge pattern Br is patterned. The bridge pattern Br may be located at a position horizontally adjacent to a vertically overlapping portion between the source electrode S of the switch element Tr and a horizontal plane of the bridge pattern Br.

A second passivation layer PAS2 may be formed to cover the bridge pattern Br. On the second passivation layer PAS2, a patterned first conductive pattern PT1-1 may be disposed. The first conductive pattern PT1-1 may be made of the same material as that of the common electrode 7. For example, the first conductive pattern PT1-1 may be made of a transparent electrode ITO. A third passivation layer PAS3 may be formed to cover the first conductive pattern PT1-1. On the third passivation layer PAS3, a second conductive pattern PT2-1 may be disposed, which may be made of the same material as the pixel electrode 5. For example, the second conductive pattern PT2-1 may be made of a transparent electrode ITO.

The bridge pattern Br may be coupled to the first conductive pattern PT1-1 via a third contact via CNT2-1 passing through the second passivation layer PAS2. The second conductive pattern PT2-1 may be coupled to the first conductive pattern PT1-1 via a fourth contact via CNT3-1 passing through the third passivation layer PAS3. The second conductive pattern PT2-1 may be coupled to the fifth conductive pattern PT3-1 via a ninth contact via CNT5-1 passing through the interlayer insulating layer ILD, the organic insulating layer PAC, the first to third passivation layers PAS1 to PAS3. The fifth conductive pattern PT3-1 may be coupled to the source electrode S of the switch element via a tenth contact via CNT6-1.

In the second connection region A2, an interlayer insulating layer ILD may be formed to cover a sixth conductive pattern PT3-2. On the interlayer insulating layer ILD, a data line DL may be disposed. Over the data line DL, there may be disposed a stack of the first insulating layer Pas0, organic insulating layer PAC and first passivation layer PAS1 in this order. On the first passivation layer PAS1, the bridge pattern Br is patterned. The bridge pattern Br may be located at a horizontally-adjacent position to a vertically overlapping portion between the data line DL and a horizontal plane of the bridge pattern Br.

A second passivation layer PAS2 may be formed to cover the bridge pattern. On the second passivation layer PAS2, a patterned third conductive pattern PT1-2 may be disposed. A third passivation layer PAS3 may be formed to cover the third conductive pattern PT1-2. On the third passivation layer PAS3, a fourth conductive pattern PT2-2 may be disposed.

The bridge pattern Br may be coupled to the third conductive pattern PT1-2 via a sixth contact via CNT2-2 passing through the second passivation layer PAS2. The third conductive pattern PT1-2 may be coupled to the fourth conductive pattern PT2-2 via a seventh contact via CNT3-2 passing through the third passivation layer PAS3. The fourth conductive pattern PT2-2 may be coupled to the sixth conductive pattern PT3-2 via an eleventh contact via CNT5-2 passing through the interlayer insulating layer ILD, the organic insulating layer PAC, the first to third passivation layers PAS1 to PAS3. The sixth conductive pattern PT3-2 may be coupled to the data line DL via a twelfth contact via CNT6-2.

The sixth conductive pattern PT3-2 may be made of the same material as a gate electrode. For example, the sixth conductive pattern PT3-2 may be made of molybdenum Mo.

In a configuration as shown in FIG. 9, since titanium dioxide TiO2 is created at an interface between the source electrode S of the switch element Tr made of Ti/Al/Ti, and the fifth contact via CNT4-1 made of a transparent electrode ITO, a contact resistance at the interface may increase. On the contrary, in this third embodiment, a contact area between the contact via and conductive pattern changes such that an interfacial contact resistance is prevented from increasing. Therefore, since this embodiment employs a metal other than titanium, a contact resistance between the contact via and conductive pattern may decrease, leading to a reduction of mura which may otherwise occur.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a data line of a display panel extending along a direction;
    a first switching circuit of the display panel, the first switching circuit including an input and a transistor to pass a test voltage from the input of the first switching circuit to a transistor electrode of the transistor;
    a bridge pattern of the display panel, the bridge pattern electrically connecting the transistor electrode to the data line, the bridge pattern being in a different layer of the display panel than the transistor electrode;
    a first gate driver to drive first gate lines of a main display portion of the display panel, the main display portion of the display panel having a first width; and
    a second gate driver to drive second gate lines of a secondary display portion of the display panel, the secondary display portion of the display panel having a second width smaller than the first width, the second gate driver being aligned with the data line along the direction.

2. The display device of claim 1, wherein the bridge pattern overlaps with the second gate driver.

3. The display device of claim 2, wherein the data line, the transistor electrode, and the second gate driver are on a same layer.

4. The display device of claim 1, wherein at least a part of the bridge pattern extends from the data line to the transistor electrode in another direction different from the direction.

5. The display device of claim 1, wherein the first switching circuit further includes additional transistors to pass the test voltage from the input of the first switching circuit to transistor electrodes of the additional transistors, the display device further comprising:
    additional bridge patterns of the display panel, each of the additional bridge patterns electrically connecting a corresponding one of the transistor electrodes to a corresponding data line of the display panel.

6. The display device of claim 1, further comprising:
    a second switching circuit of the display panel, the second switching circuit including an input and additional transistors to pass the test voltage from the input of the second switching circuit to transistor electrodes of the additional transistors; and
    additional bridge patterns of the display panel, each of the additional bridge patterns electrically connecting a corresponding one of the transistor electrodes to a corresponding data line of the display panel.

7. The display device of claim 1, further comprising:
    an insulating layer over the data line and the transistor electrode, the bridge pattern over the insulating layer, the bridge pattern coupled to the transistor electrode through a first contact via of the insulating layer, the bridge pattern coupled to the data line through a second contact via of the insulating layer.

8. The display device of claim 7, further comprising:
    a first conductive pattern over the bridge pattern,
    wherein the first conductive pattern extends through the first contact via to contact the transistor electrode, the bridge pattern coupled to the transistor electrode through the first conductive pattern.

9. The display device of claim 8, further comprising:
    a second conductive pattern between the first conductive pattern and the bridge pattern,
    wherein the bridge pattern is coupled to the transistor electrode through the second conductive pattern and the first conductive pattern.

10. The display device of claim 9, further comprising:
    a third conductive pattern over the bridge pattern; and
    a fourth conductive pattern between the third conductive pattern and the bridge pattern,
    wherein the third conductive pattern extends through the second contact via to contact the data line, the bridge pattern coupled to the data line through the fourth conductive pattern and the third conductive pattern.

11. The display device of claim 7, further comprising:
a first conductive pattern under the transistor electrode, the transistor electrode to contact the first conductive pattern; and
a second conductive pattern under the data line, the data line to contact the second conductive pattern,
wherein the bridge pattern is coupled to the transistor electrode through the first conductive pattern, and the bridge pattern is coupled to the data line through the second conductive pattern.

12. The display device of claim 11, wherein the transistor electrode is one of a drain electrode and a source electrode of the transistor, and the data line is made of a same material as the transistor electrode, and wherein the first conductive pattern and the second conductive pattern are made of a same material as a gate electrode of the transistor.

13. The display device of claim 11, wherein the first conductive pattern and the second conductive pattern include molybdenum.

14. The display device of claim 11, further comprising:
a third conductive pattern over the bridge pattern; and
a fourth conductive pattern over the bridge pattern,
wherein the third conductive pattern extends through the first contact via to contact the first conductive pattern, the bridge pattern coupled to the transistor electrode through the third conductive pattern and the first conductive pattern, and
wherein the fourth conductive pattern extends through the second contact via to contact the second conductive pattern, the bridge pattern coupled to the data line through the fourth conductive pattern and the second conductive pattern.

15. The display device of claim 14, further comprising:
a fifth conductive pattern between the third conductive pattern and the bridge pattern; and
a sixth conductive pattern between the fourth conductive pattern and the bridge pattern,
wherein the bridge pattern is coupled to the transistor electrode through the fifth conductive pattern, the third conductive pattern and the first conductive pattern, and
wherein the bridge pattern is coupled to the data line through the sixth conductive pattern, the fourth conductive pattern and the second conductive pattern.

16. The display device of claim 15,
wherein the transistor electrode is one of a drain electrode and a source electrode of the transistor, and the data line is made of a same material as the transistor electrode,
wherein the first conductive pattern and the second conductive pattern are made of a same material as a gate electrode of the transistor,
wherein the third conductive pattern and the fourth conductive pattern are made of a same material as a pixel electrode to which a data voltage is applied for displaying an image, and
wherein the fifth conductive pattern and the sixth conductive pattern are made of a same material as a common electrode to which a common voltage is applied to display the image.

17. A display device comprising:
a display panel comprising:
a main display portion having a first width along a first direction;
a secondary display portion adjacent to the main display portion in a second direction perpendicular to the first direction, the secondary display portion abutting the main display portion and having a second width less than the first width along the first direction;
a data line extending along the second direction; and
a corner region where the main display portion and secondary display portion abut, the corner region having an interior angle greater than 180 degrees and less than 300 degrees; and
a first gate driver to drive first gate lines of the main display portion of the display panel; and
a second gate driver to drive second gate lines of the secondary display portion of the display panel, the second gate driver being aligned with the data line along the second direction.

18. The display device of claim 17, wherein:
the first gate lines and the second gate lines extend along the first direction.

19. The display device of claim 18,
wherein a first edge of the main display portion extends away from the corner region,
wherein a second edge of the secondary display portion extends away from the corner region, and
wherein the interior angle of the corner region is an angle between the first edge and the second edge within the main display portion and the secondary display portion.

20. The display device of claim 19, wherein the main display portion comprises:
a third edge perpendicular to the first edge,
a fourth edge perpendicular to the first edge and parallel to the third edge, and
a fifth edge parallel to the first edge, the fifth edge having the first width between the third edge and the fourth edge.

21. The display device of claim 20, wherein the secondary display portion comprises:
a sixth edge parallel to the second edge, and
a seventh edge parallel to the fifth edge, the seventh edge having the second width between the second edge and the sixth edge.

22. The display device of claim 21, wherein the sixth edge and the fourth edge are aligned with each other.

23. A display device comprising:
a display panel having a display area and a non-display area;
a plurality of data lines disposed in the display area along a first direction;
a plurality of gate lines disposed in the display area along a second direction, the plurality of gate lines crossing the plurality of data lines;
a plurality of gate drivers to drive the plurality of gate lines of the display panel;
a first switching circuit in a first area of the non-display area, the first switching circuit including an input and a transistor to pass a test voltage from the input of the first switching circuit to a transistor electrode of the transistor; and
a second switching circuit in a second area of the non-display area, the second switching circuit including an input and additional transistors to pass the test voltage from the input of the second switching circuit to transistor electrodes of the additional transistors, the second switching circuit adjacent to the first switching circuit and at least one of the plurality of gate drivers,
wherein the second area is apart from the first area in the first direction.

24. The display device of claim 23,
wherein the display area includes a main display portion and a secondary display portion, and
wherein the plurality of gate drivers include a first gate driver of the plurality of gate drivers to drive a gate line of the main display portion and a second gate driver of the plurality of gate drivers to drive a gate line of the secondary display portion.

25. The display device of claim 24, wherein the second switching circuit is disposed in an inner space of a corner of the display panel, the inner space defined by one side of the first switching circuit and one side of the second gate driver.

26. The display device of claim 24, wherein at least one of the plurality of data lines is disposed in an extending area along the first direction from the second gate driver.

27. The display device of claim 26, wherein said at least one of the plurality of data lines in the extending area is electrically connected to an additional transistor of the second switching circuit through a bridge pattern.

28. The display device of claim 23, wherein the first switching circuit is configured to pass the test voltage to a data line of the plurality of data lines aligned with a gate driver in the first direction, and wherein the second switching circuit is configured to pass the test voltage to data lines of the plurality of data lines not aligned with the gate driver in the first direction.

* * * * *